UNITED STATES PATENT OFFICE.

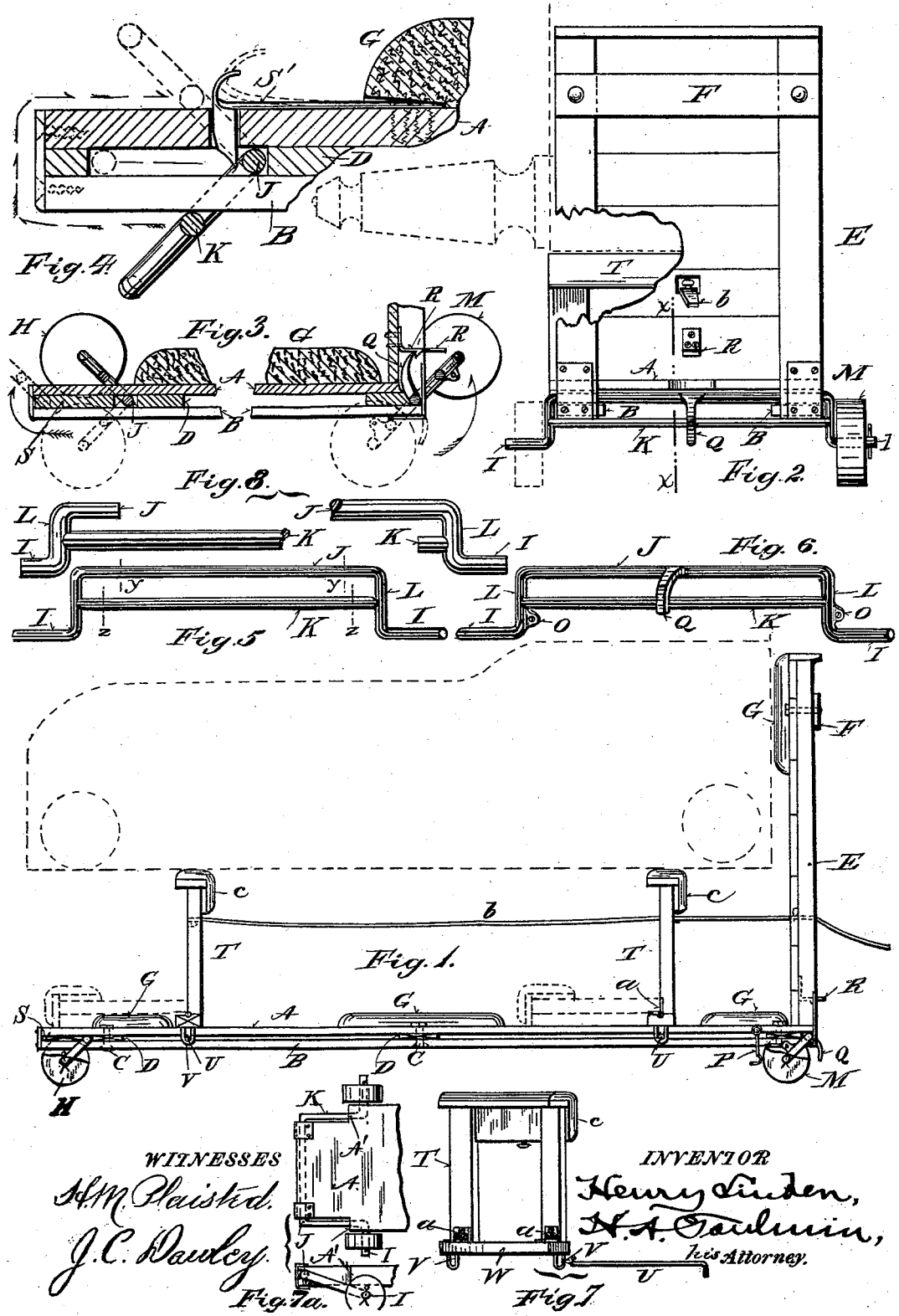

HENRY LINDEN, OF SPRINGFIELD, OHIO, ASSIGNOR OF ONE-HALF TO THOMAS WALL, OF SAME PLACE.

PIANO-TRUCK.

SPECIFICATION forming part of Letters Patent No. 459,365, dated September 8, 1891.

Application filed March 16, 1891. Serial No. 385,296. (No model.)

*To all whom it may concern:*

Be it known that I, HENRY LINDEN, a citizen of the United States, residing at Springfield, in the county of Clark and State of Ohio, have invented certain new and useful Improvements in Piano-Trucks, of which the following is a specification, reference being had therein to the accompanying drawings.

My invention relates to certain new and useful improvements in piano-trucks.

My improvements have reference to a combination piano-truck adapted to be used with either square or upright pianos; have reference to an arrangement of the forward and rear wheels and their supporting-frames, whereby they may be reversed; have reference to a reversing means for said wheels and frames; have reference to a truck-body adapted to be used with said improvements, and have reference to other points of detail hereinafter described and claimed.

In the accompanying drawings, forming a part of this specification, and on which like reference-letters indicate corresponding parts, Figure 1 represents a side view of my combination piano-truck in position to be used with a square piano; Fig. 2, a rear view of one end of said truck; Fig. 3, a cross-section on the line $x\ x$ of Fig. 2, showing the wheels reversed; Fig. 4, a section of a portion of the forward end of the truck, showing one means for retaining the forward axle-frame in position; Fig. 5, a detached view of the forward-wheel frame; Fig. 6, a similar view of the rear-wheel frame; Fig. 7, a detached perspective view of the supporting-trestle and its cross-bar or fastening-rod; Fig. 7ª, a plan and edge view of one end of the truck, showing a modification with the stops on the truck-body; and Fig. 8 other forms of a wheel-frame on the same principle.

The letter A designates the bottom of the truck-body, and the letter B the side strips or skids secured to the said body by bolts C and separated therefrom by cross-strips D, so as to form a light yet strong frame-work.

The back E at the rear end of the truck-body is provided with a cross-piece F, secured thereto for convenience in lifting the rear end of the truck. The truck-body is cushioned at suitable points G, where the piano rests or bears against the same. The truck-body is supported on wheels, preferably located at each end thereof, the forward wheels H being mounted on axles I, forming part of a frame consisting of a cross-piece J, adapted to fit between the bottom A and the strips B, and also of a cross strengthening-piece K, preferably secured to the crank portions L of said frame-work about midway of the axles I and J. This cross-piece K serves as a stop or rest against the strips B when the wheels are in their lower position, as shown in Fig. 1. It also prevents the spreading of the axles I under the weight of the piano. The space between the pieces J and K is preferably but little more than the thickness of the strips B, whereby the said frame may be slid on said strips and will bind thereon when in a slightly-inclined position. The rear wheels M are supported on a similar frame, which is additionally provided with eye-lugs O, whereby hooks P may secure the said rear frame, if so desired, in its lower position against any accidental reversing of the same. This frame also has a hook or projection Q, preferably at the center of the upper axle J, which is adapted to engage with a spring R, secured to the back of the truck when the said rear wheels are thrown to their reversed and upper position. It will be seen from Fig. 1 that the frame and the rear wheels may be reversed by inserting the toe under the hook Q and throwing it into engagement with said spring R while the hands are lifting on the cross-strip F. Also, the toe may break the engagement of the said hook and spring and throw the rear wheels into their lower position when so desired. This allows the man at the rear end of the truck to adjust the wheels without any assistance and without losing his hold of the back of the truck. The forward wheels H and their supporting-frames may also be reversed, as indicated in Fig. 3, whereby a clear sliding surface is provided and the wheels are thrown out of the way and secured in their reversed position. The axle J of the forward frame is secured at suitable distance from the end of the truck-body to allow of the cross-piece K resting on said skids, and this may be done either by means of a sliding block or key S, Figs. 1 and 3, or by a spring S', Fig. 4. By removing the key S or raising the spring S' the said frame may be slid forward, as indicated by arrows, until the cross-piece K passes to the upper surface of the truck-body and supports the forward wheels in their reversed position. Any other suitable means may be employed to hold these frames in their operative and reversed positions.

The trestle or support T is secured near each end of the truck-body, and is preferably detachable therefrom and adapted to be thrown down when not required for use as a trestle. I have shown one means of detachably securing said trestles by inserting the cross rod or pin U through staples or eyes V, secured to a cross-strip W, to which is pivoted by hinges a the said trestle or support T. This cross rod or pin U thus firmly holds the trestle in any convenient position upon said truck-body, as by inclosing a portion of the same when inserted in said staples or eyes V, as indicated in Fig. 1. When in their upper position, the tops of these trestles lie substantially at the height of the bottom of a square piano, and said piano may therefore be turned on its edge so as to rest on said trestles with the legs horizontal, as indicated in Fig. 2 by the dotted lines. In this position the legs may be readily removed from the piano-body and the piano lowered by turning the trestles to their dotted position in Fig. 1. If desired, the piano may be moved in this upper position of the trestles, and for greater security a connecting-strap b is secured to each trestle and to the back of the truck-body to prevent the accidental displacement of the trestles. The portions of the trestles adapted to bear upon the piano are padded to prevent injury to the latter, and it will be seen from Fig. 1 that both the trestles may be lowered together by breaking the engagement of the strap b with the truck-body. When an upright piano is to be moved, these trestles F may be detached from the truck by withdrawing the cross-rod U, as above described, and the truck thereby rendered lighter and more easily handled by the lessened weight of the same. If desired, however, the cushions G upon the body A may be dispensed with and the back cushions c of the said trestles will serve in place thereof when in their lower position. Thus it will be seen that one man at each end of the piano on the truck may readily move the same by the aid of my improvements; that the wheels may be reversed from the bottom of the truck to their upper position, thereby providing a clear sliding surface for the skids B; that this reversing action may be performed by the man at the rear of the truck without losing his hold of the back of the truck, and that the rear wheels may be thrown to their lower position by the same foot action, the change of said wheels from the lower to the upper position, or vice versa, being effected by only a slight elevation of the rear end as the wheels are reversed.

Referring to Fig. 5, it will be seen that if the upper axle is divided at y, as indicated by the dotted lines, it will have the same function as if the axle extended from crank to crank. The connection between the cranks will be maintained by the stop-pieces K, as described above. The shape of the wheel-frame thus modified is indicated in the left-hand portion of Fig. 8.

Referring again to Fig. 5, it will be seen that the cross connection K may be cut in the middle, leaving butt-end portions connected to the crank L, but still serving as stops for said cranks. Such a form is indicated in the right-hand portion of Fig. 8, in which the cross connection is maintained through the upper axle J. I wish to be understood as laying claim to this cross connection in the form of the axle J or the axle K and to the stop, whether in the form of a piece connecting said cranks, as in Fig. 5, or in the form of the stud stop-piece, as in the right-hand portion of Fig. 8. When this stop-piece does not extend from crank to crank, the lower axles may be prevented from spreading by an extra stiffness in said cranks when so required.

Referring to Fig. 7$^a$, it will be seen that the stops for the wheel-frame are formed by the shoulders A', formed on the truck-body. The wheels, when in their lower position, are supported by the said shoulders impinging on the wheel-frame. When the wheels are reversed, the said frame is thrown about its upper axle mounted in a groove in the end of the truck-body until the frame strikes against the other side of said shoulders A'. In this form the cross connection is formed by the upper axle J, while the stop is provided by the said shoulders on the body of the truck itself.

Having thus fully described my invention, what I claim as new, and desire to secure by Letters Patent, is—

1. In a piano-truck, the combination, with a truck-body consisting of a bottom, skids, and interposed separating-pieces forming a frame-work, of wheel-frames, each consisting of an upper axle adapted to be slidingly and adjustably mounted between said bottom and skids, lower axles connecting portions forming cranks, and a stop-piece connecting said cranks and adapted to bear on opposite sides of said truck-body alternately, and wheels mounted on said lower axles, whereby a light strong truck-body is movably mounted on rollers or skids, according to the lower or the reversed position of the said wheels.

2. In a combination piano-truck, the combination, with a truck-body having transverse elongated openings, of wheel-frames consisting of upper axles slidingly and rotatably mounted in said openings, lower wheel-axles, cranks connecting said upper and lower axles, and a stop-piece for said cranks adapted to bear above or below said truck-body, according to the adjusted position of said wheel-axles, wheels on said wheel-axles, and trestles pivotally mounted on said truck-body and adapted to be used as rests for a square or an upright piano, according to the raised or lowered position of the said trestles.

3. In a piano-truck, the combination, with a truck-body having a sliding-surface, of wheel-frames reversibly mounted thereon and having supporting-wheels, one wheel-frame being provided with a hook or projection adapted to be operated by the foot to reverse said frame, and means to automatically retain the latter frame in its reversed position.

4. In a piano-truck, the combination, with a truck-body having a back portion and a skid-surface, of wheel-frames having wheels and reversibly mounted in said body to allow of moving said truck by rolling or sliding, one frame being provided with a hook or projection adapted to be operated by the foot to throw the wheels into their upper position, and a spring-catch for said frame adapted to effect an engagement automatically between said body and frame and also to break said engagement by the foot to throw the said wheels to their lower position.

5. In a piano-truck, the combination, with a truck-body consisting of a bottom, skids, and interposed separating cross-pieces, of forward and rear wheel frames, the forward frame consisting of an upper axle slidingly and rotatably mounted between said bottom and skids, crank portions of said frames, lower axles provided with wheels, and a cross-bar between said crank portions adapted to bear above or below said truck-body when the frame is in its upper or lower position, respectively, means to secure said frame in its adjusted position, the rear-wheel frame being similar to said forward frame and additionally provided with a hook or projection adapted to be operated by the foot to reverse said frame, and means automatically to secure it in said reversed position.

In testimony whereof I affix my signature in presence of two witnesses.

HENRY LINDEN.

Witnesses:
 OLIVER H. MILLER,
 JOHN E. FENWICK.